(12) United States Patent
Tseng et al.

(10) Patent No.: US 9,974,352 B2
(45) Date of Patent: May 22, 2018

(54) POWER GENERATING DEVICE AND AN OBJECT FOR UTILIZING THE POWER GENERATING DEVICE

(71) Applicant: Shen-Ko Tseng, Taipei (TW)

(72) Inventors: Shen-Ko Tseng, Taipei (TW);
Juinne-Ching Liao, Taoyuan County (TW)

(73) Assignee: Shen-Ko Tseng, Taipei (TW)

( * ) Notice: Subject to any disclaimer, the term of this patent is extended or adjusted under 35 U.S.C. 154(b) by 328 days.

(21) Appl. No.: 15/072,211

(22) Filed: Mar. 16, 2016

(65) Prior Publication Data

US 2016/0276961 A1    Sep. 22, 2016

(30) Foreign Application Priority Data

Mar. 17, 2015    (CN) ............ 2015 2 0149811 U

(51) Int. Cl.
*H02K 7/18* (2006.01)
*H02K 35/02* (2006.01)
*A43B 3/00* (2006.01)
*H05B 33/08* (2006.01)
*H02K 7/00* (2006.01)
*H02K 35/00* (2006.01)

(52) U.S. Cl.
CPC ............ *A43B 3/001* (2013.01); *A43B 3/0015* (2013.01); *H02K 7/1876* (2013.01); *H02K 35/02* (2013.01); *H05B 33/0803* (2013.01); *H05B 33/0842* (2013.01)

(58) Field of Classification Search
CPC .... H02K 7/1869; H02K 7/1876; H02K 35/02; A43B 3/001; A43B 3/0015
See application file for complete search history.

(56) References Cited

U.S. PATENT DOCUMENTS

| | | | | |
|---|---|---|---|---|
| 8,944,629 B2 * | 2/2015 | Tseng | ..................... | H02K 35/04 320/108 |
| 9,013,084 B2 * | 4/2015 | Ruff | ......................... | E04B 1/21 310/12.12 |
| 9,095,184 B2 * | 8/2015 | Tseng | .................... | A43B 3/0005 |
| 9,143,060 B2 * | 9/2015 | Tseng | ..................... | H02K 35/04 |
| 9,215,905 B2 * | 12/2015 | Tseng | ....................... | A43B 7/02 |
| 9,236,788 B2 * | 1/2016 | Ruff | ...................... | H02K 7/1876 |
| 9,356,499 B2 * | 5/2016 | Kinoshita | ............. | H02K 35/02 |
| 9,484,796 B2 * | 11/2016 | Ruff | ..................... | H02K 7/1876 |
| 9,498,016 B2 * | 11/2016 | Tseng | ..................... | A43B 3/001 |
| 9,509,304 B2 * | 11/2016 | Ruff | ........................ | G08C 17/00 |

(Continued)

FOREIGN PATENT DOCUMENTS

CN    202918172 U    *    5/2013

*Primary Examiner* — Edgardo San Martin

(57) ABSTRACT

The present invention provides a power generating device, comprising a first shell, a sensor module, a second shell, a magnetic module and a cover. The sensor module is disposed in the first hollow portion. The second shell is disposed on the first shell. The magnetic module is configured on the fixture tank of the second shell. The magnetic module is held in the fixture tank by the cover. When an external force is applied on the power generating device, the cover makes the magnetic module move in the sensor module along the direction of the external force, and an induced current is generated on the induction coil. The restoring force is applied to the magnetic module by the sensor module.

16 Claims, 11 Drawing Sheets

(56) References Cited

U.S. PATENT DOCUMENTS

| | | | | |
|---|---|---|---|---|
| 9,647,521 B2* | 5/2017 | Tseng | .................... | H02K 35/02 |
| 2008/0129147 A1* | 6/2008 | Thiesen | ................ | B60C 23/041 |
| | | | | 310/319 |
| 2009/0058099 A1* | 3/2009 | Ghassemi | ................. | F03G 7/08 |
| | | | | 290/4 B |
| 2015/0097374 A1* | 4/2015 | Lin | .......................... | F03G 5/06 |
| | | | | 290/1 R |
| 2015/0279598 A1* | 10/2015 | Matsumoto | .......... | H02K 7/1853 |
| | | | | 335/205 |
| 2015/0318776 A1* | 11/2015 | Tseng | ................ | H05B 33/0806 |
| | | | | 310/15 |
| 2016/0111947 A1* | 4/2016 | Tseng | .................... | H02K 35/02 |
| | | | | 290/1 A |
| 2017/0149321 A1* | 5/2017 | Kato | .................... | H02K 35/02 |

\* cited by examiner

POWER GENERATING DEVICE AND AN OBJECT FOR UTILIZING THE POWER GENERATING DEVICE

BACKGROUND OF THE INVENTION

1. Field of the Invention

The present invention relates to a power generating device and a shoe for utilizing the power generating device, more particularly, to a power generating device using electromagnetic induction to generate power by utilizing the electromagnetic induction.

2. Description of the Prior Art

In order to comply with the current worldwide trend of energy conservation and environmental protection, many practical and energy-saving products are being sold in the market. Among them, the products that can generate power through simple actions performed by their users not only achieve the goal of energy conservation and environmental protection but also fulfill the needs to be innovative and interesting. For examples, the products that can generate power are flashlights that can generate power through force generated from a hand and the bicycles that can change mechanical energy to electrical energy.

In another example, when a pedestrian is walking at night where the light surrounding him/her is inadequate, there is a higher probability of traffic accidents. Because of this, pedestrians often need to equip with reflective devices or self-luminous devices to increase their visibility at night. Because the self-luminous devices need to be carried everywhere, thin-type batteries are usually set inside the devices. However, the thin-type battery mentioned above contains mercury, which causes pollution to the environment. Additionally, if the devices do not have the appropriate waterproofing ability, the battery mentioned above will more likely induce problems such as current leakage, damp, or damage.

To summarize the statements mentioned above, if the self-luminous devices can generate power through simple actions performed by their users and the structure inside is simple and does not need high grade waterproofing equipment, the mercury battery with high pollution will no longer be needed, which is more convenient for the pedestrians to use and also increases the traffic security of the pedestrians. Therefore, a device capable of solving the aforementioned problems above has extremely high practicality and is an urgent problem every company in the industry eagers to solve.

SUMMARY OF THE INVENTION

An object of the present invention is to provide a power generating device that can generate power through simple actions performed by its users. Therefore, the mercury battery that causes pollution does not need to be set in the devices, and the traffic security of the pedestrians can be increased by the generated LED light source.

According to an embodiment of the present invention, the present invention provides a power generating device comprising a first shell, a sensor module, a second shell, a magnetic module and a cover. The first shell comprises a first hollow portion; a sensor module is disposed in the first hollow portion. The sensor module comprises a first magnetism element, an induction coil coiled on the first magnetism element and a second magnetism element. The second magnetism element is disposed on the first magnetism element; a second shell is disposed on the first shell, and the second shell comprises a fixture tank. A magnetic module is configured in the fixture tank, and the magnetic module comprises a first magnetic element and a second magnetic element; the magnetic module is held in the fixture tank by a cover.

Wherein when the external force is applied to the power generating device, the cover makes the magnetic module move within the sensor module along the direction of the external force, an induced current is generated on the induction coil, and the sensor module applies a restoring force to the magnetic module.

Based on the design mentioned above, the first magnetism element comprises a first slide gap, and the second magnetism element comprises a second slide gap. When the external force is not applied to the power generating device, the first magnetic element is located within the first slide gap, and the second magnetic element is located within the second slide gap. When the external force is applied to the power generating device, the first magnetic element of the magnetic module moves to the second slide gap along the direction of the external force, and the second magnetic element moves away from the second slide gap along the direction of the external force. When the external force applied to the power generating device is vanished, the first magnetism element and the second magnetism element apply the restoring force to the first magnetic element and the second magnetic element to make the first magnetic element and the second magnetic element move through the opposite direction of the external force.

Based on the design mentioned above, the first magnetism element selectively comprises a first sensor arm, a second sensor arm and a first connecting portion. The first sensor arm comprises a first extension section and a first wrapping portion for the induction coil being coiled on the first wrapping portion. The second sensor arm comprises a second extension section and a second wrapping portion for the induction coil being coiled on the second wrapping portion. Wherein the first slide gap is formed between the first extension section and the second extension section, and the first sensor arm is connected with the second sensor arm through the first connecting portion Based on the design mentioned above, the second magnetism element selectively comprises a third sensor arm, a fourth sensor arm and a second connecting portion. The third sensor arm comprises a third extension section. The fourth sensor arm comprises the fourth extension section. The second slide gap is formed between the third extension section and the fourth extension section, and the third sensor arm is connected with the fourth sensor arm through the second connecting portion.

Based on the design mentioned above, the sensor module selectively comprises a pad. The pad is disposed between the first magnetism element and the second magnetism element. The pad comprises a fifth extension section, a sixth extension section and a third connecting portion. A third slide gap is formed between the fifth extension section and the sixth extension section. The fifth extension section is connected with the sixth extension section through the third connecting portion. When the external force is applied to the power generating device, the cover makes the magnetic module move within the first slide gap, the second slide gap and the third slide gap along the direction of the external force.

According to an embodiment of the present invention, an object for utilizing a power generating device has an accommodating space for holding the power generating device. The power generating device comprises first shell, a sensor module, a second shell, a magnetic module and a cover. The first shell has a first hollow portion; the sensor module is disposed in the first hollow portion, and the sensor module comprises first magnetism element, an induction coil coiled on the first magnetism element and a second magnetism element. The second magnetism element is disposed on the first magnetism element; a second shell is disposed on the first shell, the second shell comprises a fixture tank; a magnetic module is configured in the fixture tank; the magnetic module comprises a first magnetic element and a second magnetic element; and the magnetic module is held in the fixture tank by the cover.

Wherein when the external force is applied to the power generating device, the cover makes the magnetic module move within the sensor module along the direction of the external force, an induced current is generated on the induction coil, and the sensor module applies a restoring force to the magnetic module.

Based on the design mentioned above, the object mentioned above can be a shoe, and the accommodating space mentioned above is located at the sole of the shoe.

To summarize the statements mentioned above, the power generating device of the present invention can be used in shoe pads or ground pads. When a user walks or activates the power generating device through an external force, the power generating device will use electromagnetic induction to generate an induced current, to which the induced current can be stored to supply power to the light emitting diodes in order to emit light. Otherwise, the elastic element of the power generating device of the present invention is not essential to be disposed; that is to say, the magnetic attractive force is generated to provide the restoring force to the cover holding the magnetic module through the sensor module. Therefore, the power generating device of the present invention can be easily installed in shoes to generate power automatically when a user performs an action such as walking. More particularly, the lighting module of the power generating device of the present invention can increase the visibility at night, which also increases the traffic security of the pedestrians.

The advantages and spirits of the invention may be understood by the following recitations together with the appended drawings.

BRIEF DESCRIPTION OF THE APPENDED DRAWINGS

Some of the embodiments will be described in detail, with reference to the following figures, wherein like designations denote like members, wherein.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1A:
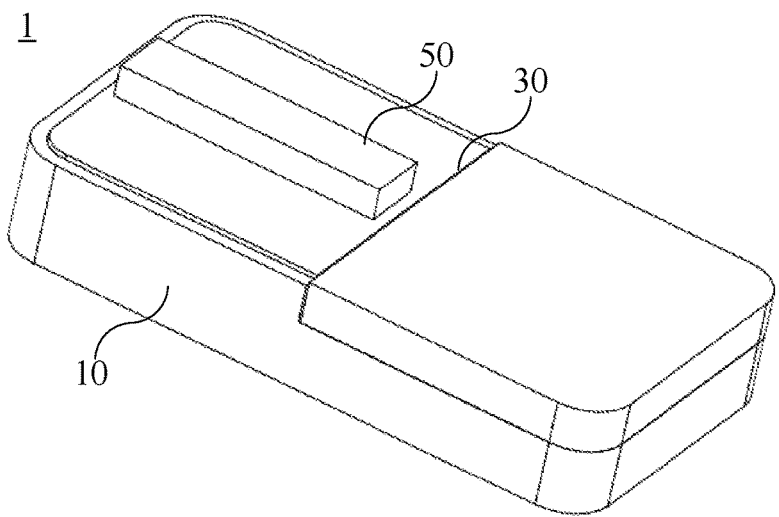
FIG. 1A and FIG. 1B show the diagram of the power generating device in different angles in an embodiment of the present invention.
Figure 1B:
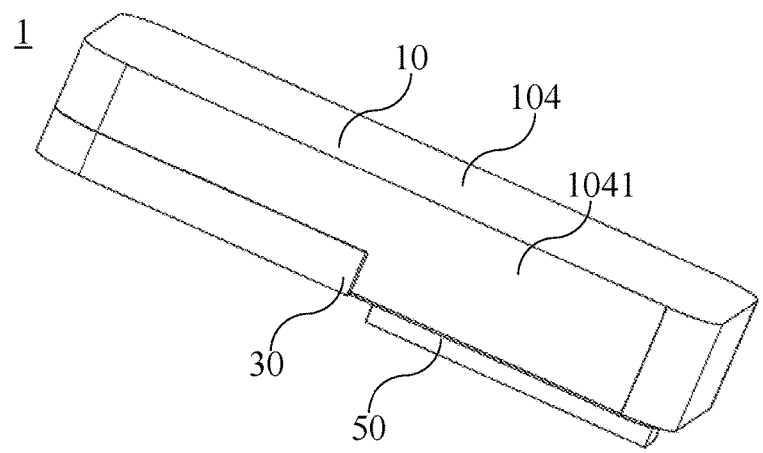
Figure 1C:
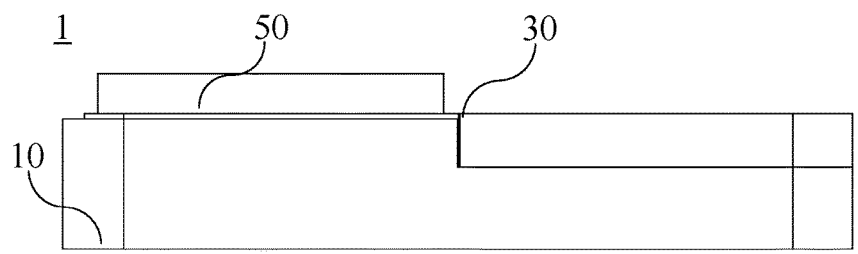
FIG. 1C shows a left view of the diagram of power generating device in an embodiment of the present invention.
Figure 2:
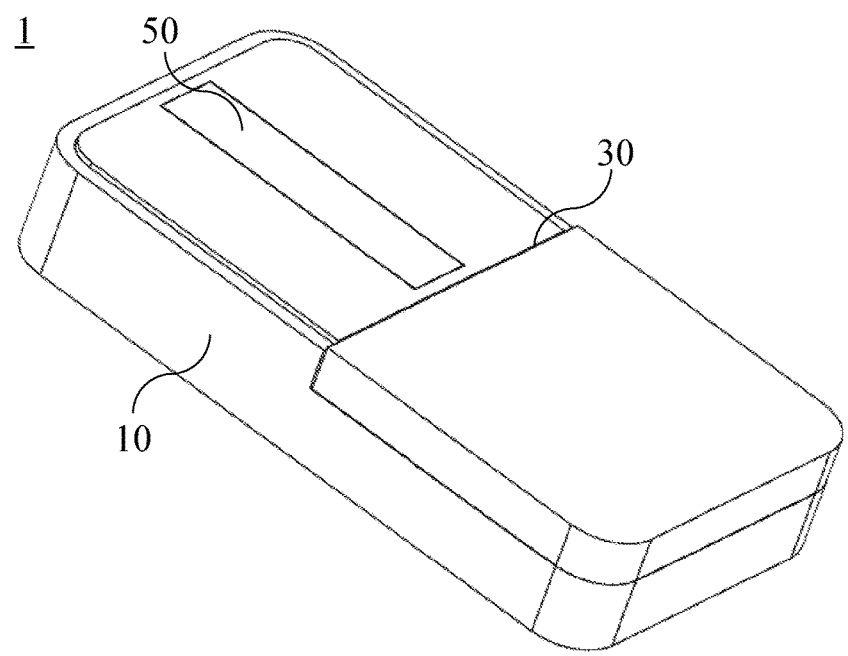
FIG. 2 shows the power generating device applied an external force in an embodiment of the present invention.
Figure 3:
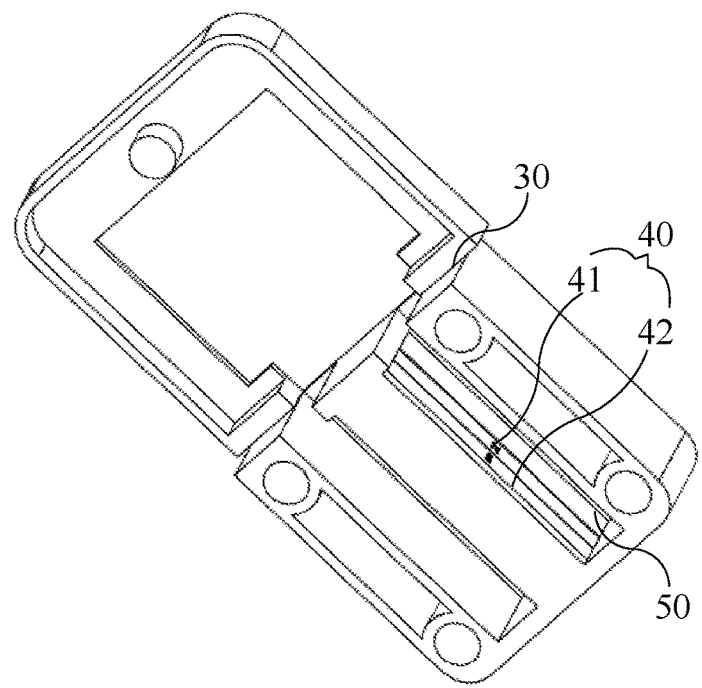
FIG. 3 shows the diagram of the second shell, the magnetic module and the cover of FIG. 2 in the embodiment of the present invention.
Figure 4:
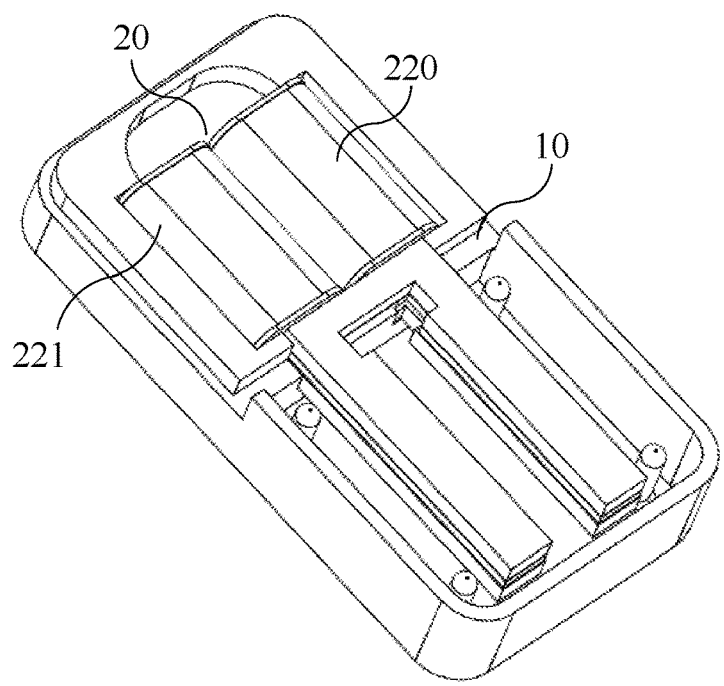
FIG. 4 shows the diagram of the first shell and the sensor module of FIG. 2 in the embodiment of the present invention.

Please refer to FIG. 1A to FIG. 1B. FIG. 1A and FIG. 1B show the diagram of the power generating device in different angles in an embodiment of the present invention. FIG. 1C shows a left view of the diagram of power generating device in an embodiment of the present invention. FIG. 2 shows the power generating device applied an external force in an embodiment of the present invention. FIG. 3 shows the diagram of the second shell, the magnetic module and the cover of FIG. 2 in the embodiment of the present invention. FIG. 4 shows the diagram of the first shell and the sensor module of FIG. 2 in the embodiment of the present invention. It is worth noting that the appended drawings of the present invention are drawn according to a real life scale.

According to the figures mentioned above, in the embodiment, the power generating device 1 comprises a first shell 10, a sensor module 20, a second shell 30, a magnetic module 40 and a cover 50.

The first shell 10 has a first hollow portion and a first opening portion. The sensor module 20 is configured in the first hollow portion. The second shell 30 comprises an external surface, an opening and a fixture tank. The second shell 30 is disposed on the first opening portion to avoid the first hollow portion contacting with the outside. The magnetic module 40 is held in the fixture tank of the second shell 30 by the cover 50 penetrating through the opening of the second shell 30. A magnetic attraction force is generated between the sensor module 20 and the magnetic module 40 to provide a restoring force to cover held the magnetic module 40.

Figure 14:
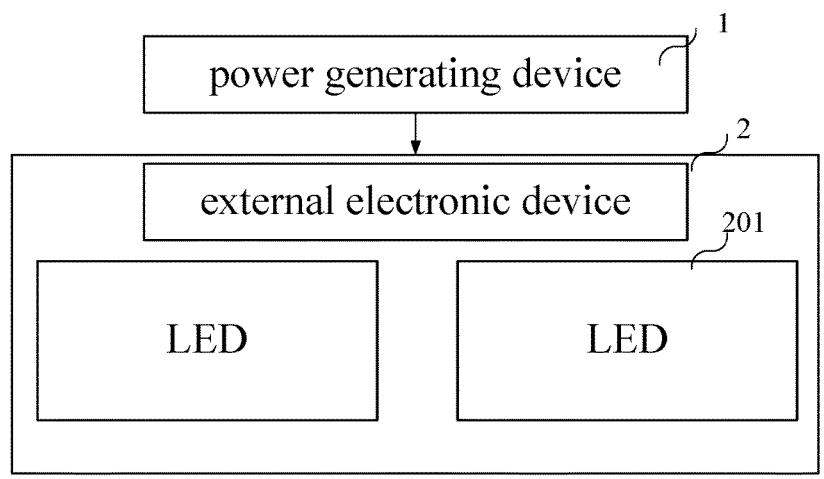
FIG. 14 shows the functional diagram of the external electronic device and the power generating device in an embodiment of the present invention.

In real applications, the power generating device 1 is able to be disposed on the carrier like the shoes. An external force is applied to the power generating device 1 directly or indirectly through the vertical direction of the power generating device 1 when the user walks. When the external force is applied to the power generating device 1, the magnetic module 40 is held by the cover 50, the relative movement is generated between the fixture tank of the second shell 30 and the cover 50, the relative movement is generated between the magnetic module 40 and the sensor module 20 at the same time, and the induction coil of the sensor module 20 induct a change in magnetic flux to generate induced current for the external electronic device 2 like the LED 201 coupled with the power generating device 1, like the FIG. 14. FIG. 14 shows the functional diagram of the external electronic device and the power generating device in an embodiment of the present invention. At the same time, when the external force is applied to the cover 50, the magnetic attraction force is generated between the sensor module 20 and the magnetic module 40 to provide a restoring force for cover 50 of the magnetic module against the external force. However, when the external force is vanished, the restoring force provided by the magnetic attraction force of the sensor module 20 moves the cover 50 through the opposite direction of the force.

Figure 5A:
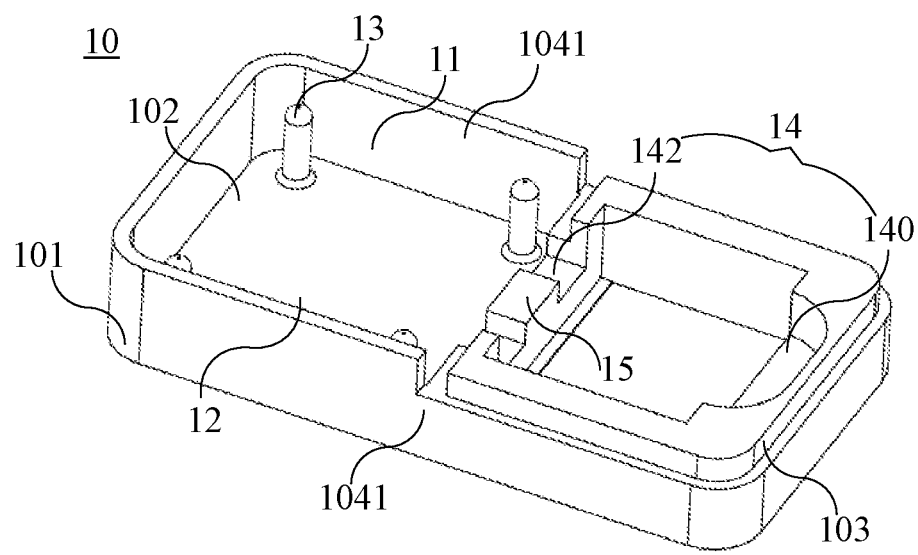
FIG. 5A and FIG. 5B show the diagram of the first shell in different angles in an embodiment of the present invention.
Figure 5B:
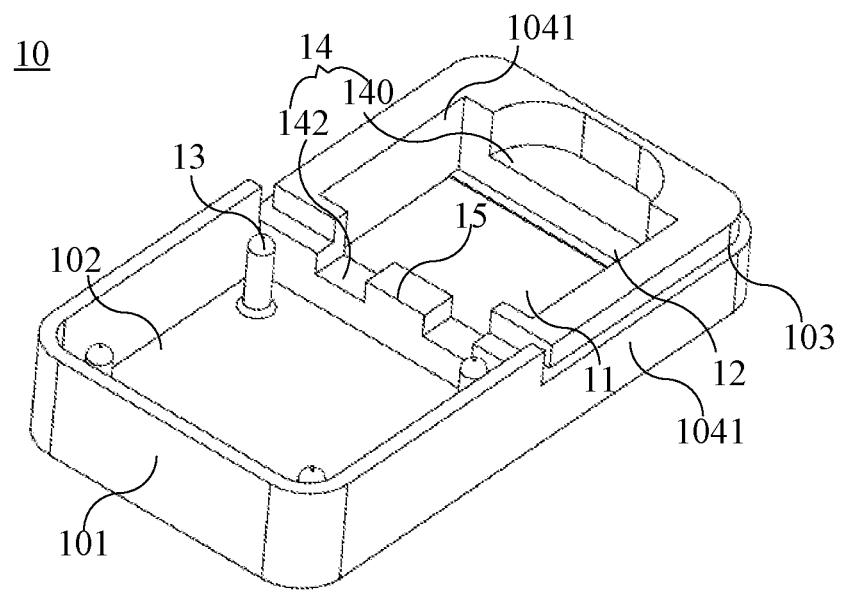

Before further illustrating the structure of the present invention, the following statement will illustrate the design of every element first. Please refer to the FIG. 1B, FIG. 5A and FIG. 5B. FIG. 5A and FIG. 5B show the diagram of the first shell in different angles in an embodiment of the present invention.

In the embodiment, the first shell 10 of the present invention is square bowl structure, and the first shell 10 has the external surface 101 and the internal surface 102.

Another aspect of the present invention, the first shell 10 has a first base portion 104 and a first wall portion 1041. The first wall portion 1041 is formed by extending from the internal surface of the first base portion 104 along the direction of the normal vector of the internal surface of the first base portion 104, the first wall portion 1041 comprises a first hollow portion 11, and the first opening portion 12 is disposed on the other end of the first hollow portion 11 corresponding to the first base portion 104. Meanwhile, the first wall portion 1041 comprises a first engaging portion 103 on the other side of the first wall portion 1041 corresponding to the first base portion 104, and the first opening portion 12 is surrounded by the first engaging portion 103. The first engaging portion 103 is buckled with the second shell 30 and disposed on the first shell 10.

Besides, the first shell 10 comprises at least a location pillar 13, a plummer 14 and a first convex pillar 15, the elements mentioned above is disposed in the first hollow portion 11 and formed by extending from the internal surface 102 of the first base portion 104 of the first shell 10 through the normal direction of the internal surface 102 of the first base portion 104 of the first shell 10.

In an embodiment, the location pillars 13 are disposed on the four corners of the first shell 10 separately. The first location pillar 13 is used to penetrate through a second location hole of the second shell 30 to make the second shell 30 be fixed when the second shell 30 disposed on the first shell 10.

The plummer 14 is used to bear the sensor module 20 to hold a first hollow portion 11 at the assigned height and the level. In an embodiment, the plummer 14 comprises a first plummer 140 and a second plummer 142, the first plummer 140 is used to bear a first connecting portion of a first magnetism element of the sensor module 20, and the second plummer 140 is used to bear a first sensor arm of a first magnetism element of the sensor module 20 and a second sensor arm. In the embodiment, the shape of the first plummer and the shape of the first connecting portion of the first magnetism element are similar to an arcus.

Figure 12:
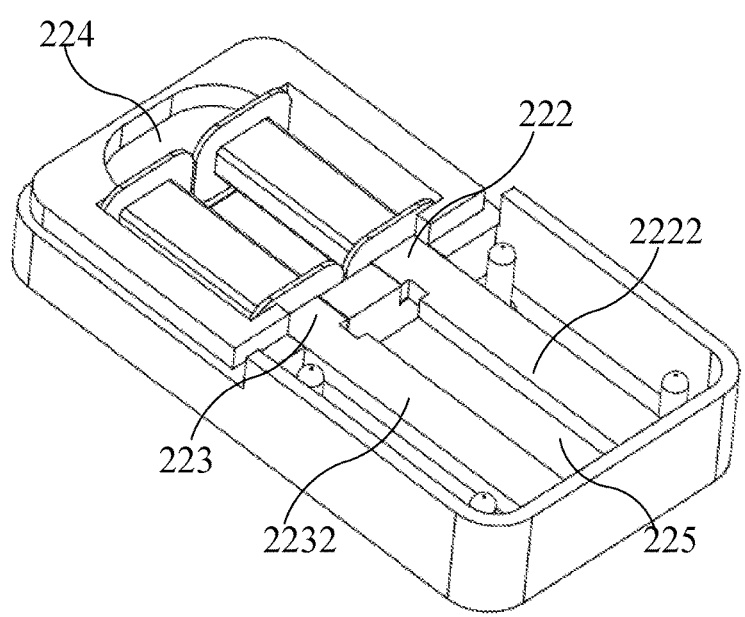
FIG. 12 shows the diagram of the power generating device comprising the first magnetism element, the first shell, the first wrapping element and the second wrapping element in an embodiment of the present invention.

Please refer to FIG. 12. FIG. 12 shows the diagram of the power generating device comprising the first magnetism element, the first shell, the first wrapping element and the second wrapping element in an embodiment of the present invention. The first convex pillar 15 is located between the two second plummers 140 to fix the first sensor arm of the first magnetism element and the second sensor arm. When the first sensor arm and the second sensor arm are disposed on the plummer 140, the convex pillar 15, a first sensor arm and the second sensor arm are at the same level, like FIG. 12, for the pad and the second magnetism element being disposed on it.

Figure 6A:
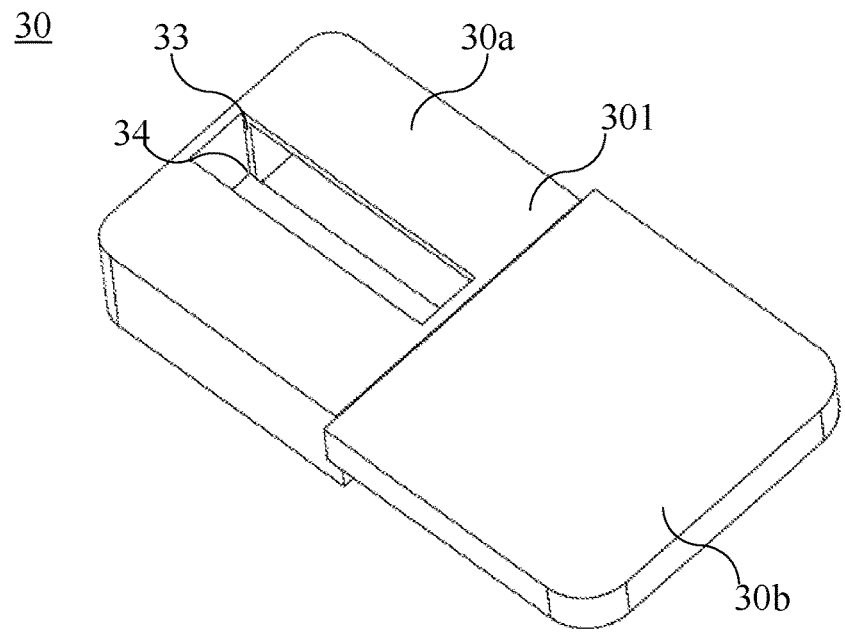
FIG. 6A shows the top view stereogram of the second shell in an embodiment of the present invention.
Figure 6B:
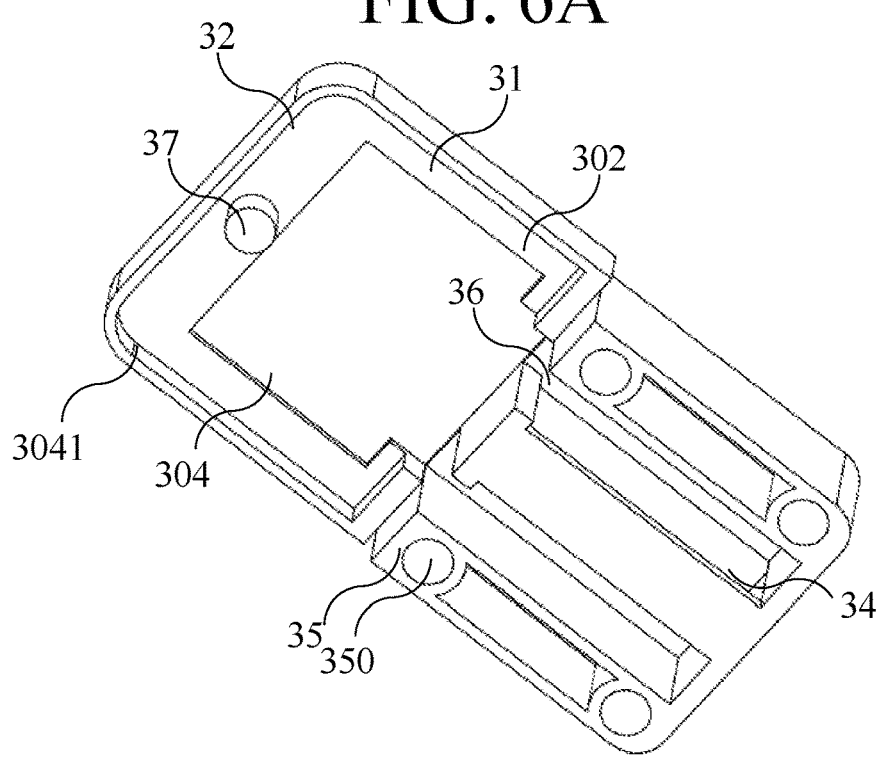
FIG. 6B shows the bottom view of the second shell in an embodiment of the present invention.

Please refer to FIG. 6A and FIG. 6B. FIG. 6A shows the top view stereogram of the second shell in an embodiment of the present invention; FIG. 6B shows the bottom view of the second shell in an embodiment of the present invention.

The second shell 30 of the present invention is square-shaped structure and has an external surface 301 and an internal surface 302. The second shell 30 has a second base portion 304 and a second wall portion 3041. The second wall portion 3041 is formed by extending outwardly from the second base portion 304 through the normal direction of the second base portion 304. The second wall portion 3041 is surrounded by a second hollow portion 31, and the second hollow portion 31 comprises a second opening portion 32 on the other side of the second hollow portion 31 corresponding to the second base portion 304. The second shell 30 is disposed on the first shell 10 through the second opening portion 32.

Moreover, the second shell 30 has an opening 33, a fixture tank 34, at least a second location pillar 35, at least a notch 36 and a second convex pillar 37. The elements mentioned above are disposed in the second hollow portion 31, and the second location pillar 35 and second convex pillar 37 are formed by extending outwardly form the internal surface 302 of the second base portion 304 of the second shell 30 through the normal direction of the internal surface 302 of the second base portion 304 of the second shell 30.

The fixture tank 34 is formed by extending inwardly from the surface of the second shell 30 corresponding to the second opening portion 32 through the normal direction of the surface of the second shell 30 for the magnetic module 40 to be disposed in it.

The opening 33 is formed on the external surface 301 of the second shell 30. The opening 33 penetrates through the external surface 301 and the internal surface 302 of the second shell 30 and connects to the fixture tank 34. The magnetic module 40 is held in the fixture tank 34 by the cover 50 through the opening 33.

The notch 36 is formed by extending inwardly from the surface of the second shell 30 corresponding to the opening 33 through the normal direction of the surface of the second shell 30. In an embodiment, when the second shell 30 is disposed on the first shell 10, a plurality of the extension sections of the sensor module 20 are buckled in it through the notch 36 to maintain the level of the sensor module. In an embodiment, when the second shell 30 is disposed on the first shell 10, the two sides of the fixture tank 34 corresponding to the notch 36 are connected to the notch 36 to make no barriers exist between the magnetic module 40 and the sensor module 20 to improve the generating efficiency of the power generating device 1.

The internal of the second location pillar 35 comprises a second location hole 350. The location of the second location pillar 35 is corresponding to the first location pillar 13. When the second shell 30 is disposed on the first shell 10, the location of the second shell 30 and the first shell 10 is fixed by the first location pillar 35 penetrating through the second location hole 350.

In an embodiment, the height of the second convex pillar is similar to the second wall portion 3041, and the location of the second convex pillar 37 is corresponding to the connecting portion of the sensor module 20. Therefore, when the second shell 30 is disposed on the first shell 10, the second shell 30 is fixed at an assigned height.

Figure 8:
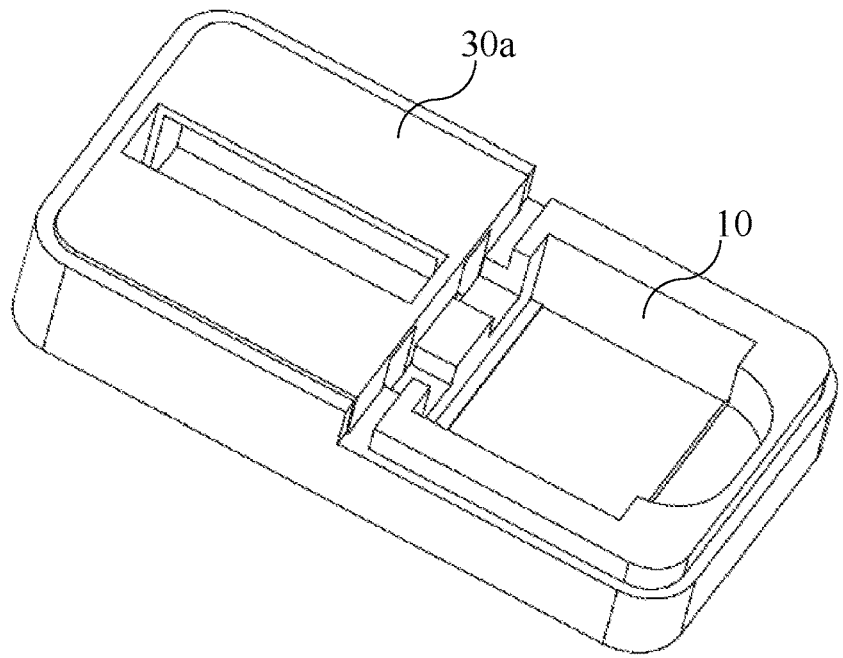
FIG. 8 shows the diagram of the front terminal of the first shell and the second shell in an embodiment of the present invention.
Figure 9:
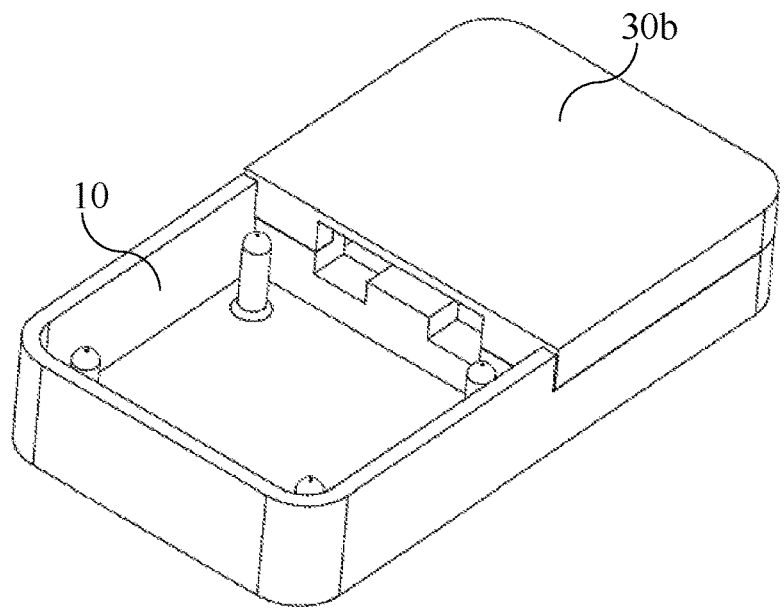
FIG. 9 shows the diagram of the rear terminal of the first shell and the second shell in an embodiment of the present invention.

Please refer to FIG. 8 and FIG. 9. FIG. 8 shows the diagram of the front terminal of the first shell and the second shell in an embodiment of the present invention. FIG. 9 shows the diagram of the rear terminal of the first shell and the second shell in an embodiment of the present invention. In an another embodiment, the second shell 30 has a front terminal 30a and a rear terminal 30b, as shown in FIG. 8 and FIG. 9. In the embodiment, the second shell 30 is a separable structure, the second shell 30 can be separated into a front terminal 30a and a rear terminal 30b disposed on the first shell 10 separately; the real application is not limited to it, and the front terminal 30a and the rear terminal 30b of the second shell 30 can be a one-pieced structure. Please refer to FIG. 8. The second wall portion 3041 of the front terminal 30a of the second shell is disposed in the first hollow portion 11 of the first shell 10, and the first shell 10 and the second wall portion 3041 are fixed through the second location hole 350 and the first location pillar 13. Please refer to FIG. 9. The second wall portion 3041 of the rear terminal 30b of the second shell 30 is disposed on the engaging portion 103 of the first shell 10 to buckle with each other.

Figure 7:
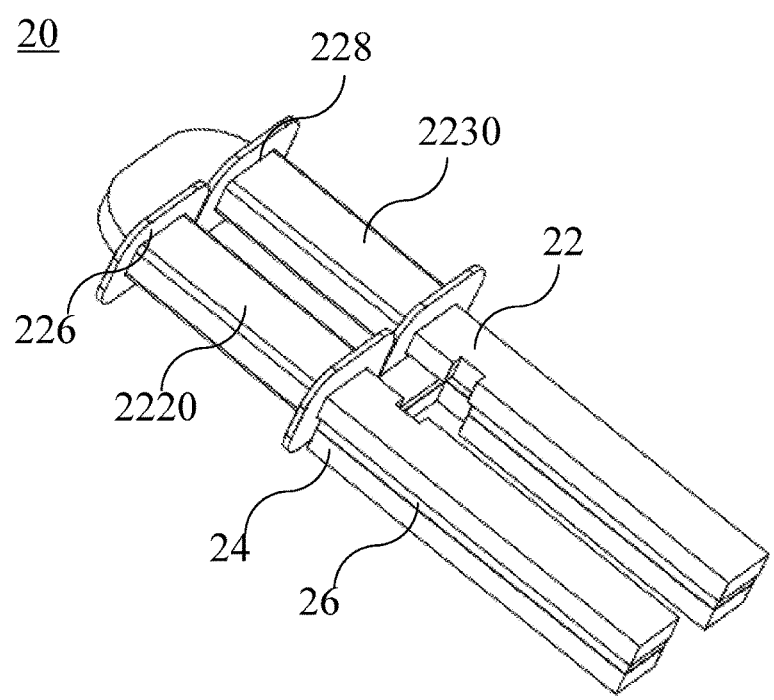
FIG. 7 shows the diagram of the sensor module in an embodiment of the present invention.
Figure 10:
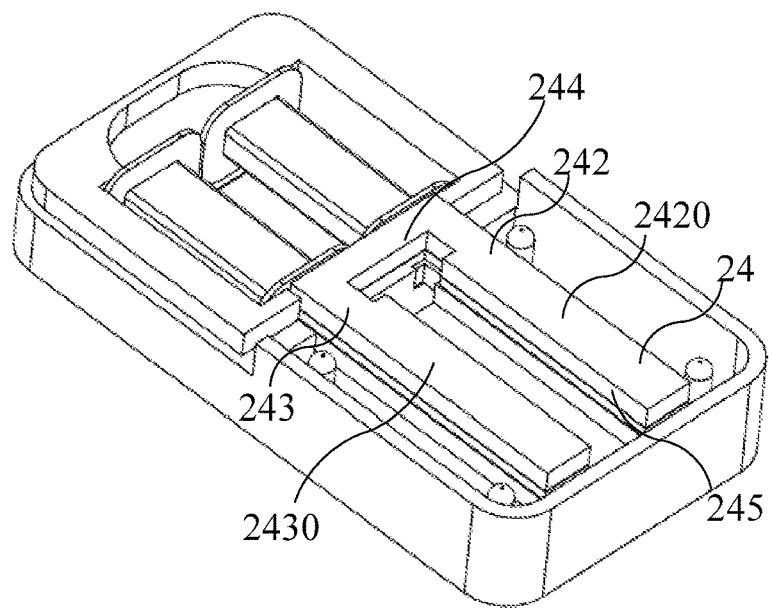
FIG. 10 shows the diagram of the power generating device comprising the second magnetism element, the pad, the first magnetism element, the first shell, the first wrapping element and the second wrapping element in an embodiment of the present invention.
Figure 11:
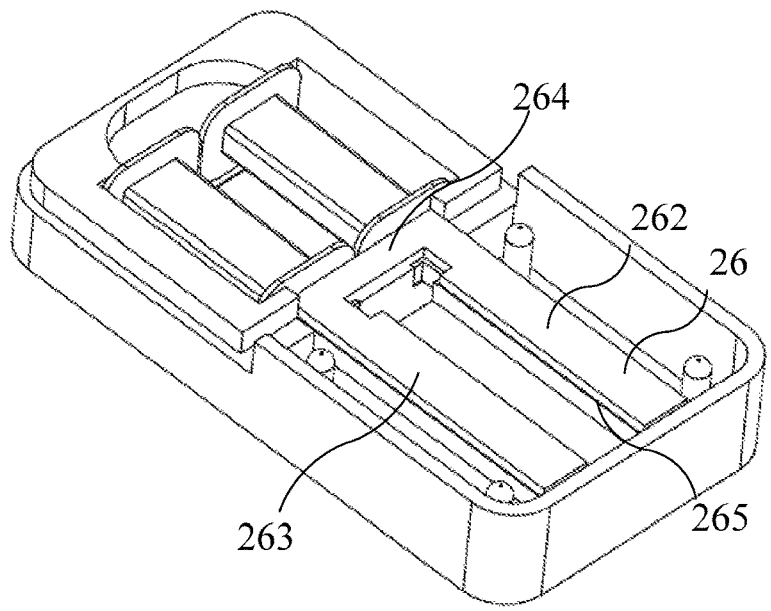
FIG. 11 shows the diagram of the power generating device comprising the pad, the first magnetism element, the first shell, the first wrapping element and the second wrapping element in an embodiment of the present invention.

Please refer to FIG. 7, FIG. 10, FIG. 11 and FIG. 12. FIG. 7 shows the diagram of the sensor module in an embodiment of the present invention. FIG. 10 shows the diagram of the power generating device comprising the second magnetism element, the pad, the first magnetism element, the first shell, the first wrapping element and the second wrapping element in an embodiment of the present invention. FIG. 11 shows the diagram of the power generating device comprising the pad, the first magnetism element, the first shell, the first wrapping element and the second wrapping element in an embodiment of the present invention. The sensor module 20 comprises a first magnetism element 22, an induction coil 220 and 221 coiled on the first magnetism element, the second magnetism element 24 and a pad 26.

The first magnetism element 22 comprises a first sensor arm 222, a second sensor arm 223, a first connecting portion 224, the first wrapping element 226 and a second wrapping element 228. In an embodiment, the first magnetism element 22 is a U-shape. The extending direction of the first sensor arm 222 and the second sensor arm 223 is vertical to the direction of the external force. In an embodiment, the first sensor arm 222 is connected with the second sensor arm 223 through the first connecting portion 224 to be a one-pieced structure but the real application is not limited to it, and the first sensor arm 222, second sensor arm 223 and the first connecting portion 224 are separable. In the embodiment, the shape of the first connecting portion 224 is an arcus similar to the first plummer 140, and the first connecting portion is configured on the first plummer 140 for being disposed in the first hollow portion of the first shell 10.

The first sensor arm 222 comprises a first wrapping portion 2220 and a first extension section 2222. At least an induction coil 220 (or named the first induction coil) is coiled on the first wrapping portion 2220. The second sensor arm 223 comprises a second wrapping portion 2230 and a second extension section 2232. At least an induction coil 221 (or named the second induction coil) is coiled on the second wrapping portion 2230. The method of coiling is not limited to the method mentioned above; in the real application, the induction coils 220 and 221 is able to be coiled on the first wrapping portion 2220, the second wrapping portion 2230 and the first connecting portion 224. In an embodiment, the shape of the cross section of the first extension section 2222 and the second extension section 2232 is rectangular similar to the second plummer 142. The first extension section 2222 and the second extension section 2232 are able to be configured on the second plummer 142 for being disposed in the first hollow portion of the first shell 10. The first slide gap 225 is formed between the first extension section 2222 and the second extension section 2232 for magnetic module 40 moving in the first slide gap 225 through a direction of the external force. In the embodiment, the total coiled turn number of the first wrapping portion 2220 and the second wrapping portion 2230 are between 3,000 turns and 3,500 turns, but not limited to it, and the total coiled turn number is adjusted by the structure of the design or the size of the wrapping portion.

In an embodiment, the first wrapping element 226 is able to penetrate and be disposed on the first wrapping portion 2220 of the first sensor arm 222 for the induction coil 220 being coiled. In the embodiment, the first wrapping portion and the first extension section are a one-pieced rectangular for the first wrapping element penetrating through the first extension section to be disposed on the first wrapping portion to improve the efficiency of the coiled operation. The second wrapping element 228 is able to penetrate and be disposed on the second wrapping portion 2230 of the second sensor arm 223 for the induction coil 221 being coiled. In the embodiment, the second wrapping portion and the second extension section are one-pieced rectangular for the second wrapping element penetrating through the second extension section to be disposed on the second wrapping portion to improve the efficiency of the coiled operation. In an embodiment, the first wrapping element and the second wrapping element are roll-shaped showed in FIG. 7 for the induction coil being coiled on it and being configured in the first shell to fix the location.

The second magnetism element 24 comprises a third sensor arm 242, a fourth sensor arm 243 and a second connecting portion 244. In an embodiment, the second magnetism element 24 is U-shaped. The extending direction of the third sensor arm 242 and the fourth sensor arm 243 is vertical to the direction of the external force. The third sensor arm 242 is connected with the fourth sensor arm 243 through the second connecting portion 244.

The third sensor arm 242 comprises the third extension section 2420. The fourth sensor arm 243 comprises the fourth extension section 2430. In an embodiment, the shape of the cross section of the third extension section 2420 and the fourth extension section 2430 is rectangular similar to the second plummer 142, and the third extension section 2420 and the fourth extension section 2430 are able to be configured on the second plummer 142 to being disposed in the first hollow portion of the first shell 10. A second slide gap 245 is formed between the third extension section 2420 and the fourth extension section 2430 for the magnetic module 40 moving through a direction of the external force in the second slide gap 245. In an embodiment, when the second magnetism element 24 is disposed on the first magnetism element, the second magnetism element 24 holds the first wrapping element 226 and the second wrapping element 228 through the second connecting portion 244, as showed in FIG. 10.

The pad 26 comprises a fifth extension section 262, a sixth extension section 263 and a third connecting portion 264. In an embodiment, the pad 26 is U-shape. The extending direction of a fifth extension section 262 and a sixth extension section 263 of the pad 26 is vertical to the direction of the external force. The fifth extension section 262 is connected with the sixth extension section 263 through the third connecting portion 264. In an embodiment, the shape of the cross section of the fifth extension section 262 and the sixth extension section 263 is rectangular similar to the second plummer 142, and the fifth extension section 262 and the sixth extension section 263 are able to be configured on the second plummer 142 for being disposed in the first hollow portion of the first shell 10. A third slide gap 265 is formed between the fifth extension section 262 and the sixth extension section 263 for magnetic module 40 moving in the first slide gap 265 through a direction of the external force. In an embodiment, when the pad 26 is disposed on the first magnetism element, the pad 26 holds the first wrapping element 226 and the second wrapping element 228 through the third connecting portion 264, as showed in FIG. 11. In an embodiment, the thickness of the pad is about 1 mm, and the thickness of the pad is adjusted in the real application by the users. In an embodiment, the pad is parallelly disposed between the first magnetism element and the second magnetism element for separating the first magnetism element and the second magnetism element Please refer to FIG. 3. In an embodiment, the magnetic module 40 comprises a first magnetic element 41 and a second magnetic element 42. The first magnetic element 41 adjoins the second magnetic element 42, and the adjoining direction is parallel to the direction of the external force. The polarity of the first magnetic element 41 and the polarity of the lateral surface of the second magnetic element 42 corresponding to the first extension section 2222 are different. For example, if the first magnetic element is N-polarity, the second magnetic element is S-polarity. The electromotive force is used efficiently through the different polarity for improving or maintaining the efficiency of the power generating. Besides, the present invention is not limited to the material of the magnetic element; for example, the material of the first magnetic element 41 and the second magnetic element 42 is magnet with high magnetism made by the Rubidium, Ferrous, Boron or other appropriate materials providing magnetic force. Otherwise, the width, thickness and the height of the first magnetic element 41 or the second magnetic element 42 in the present invention are better to be 18 mm, 2 mm and 3 mm; the size is not limited to it in the real application but is adjusted according to the size of the magnetic element.

Please refer to FIG. 1A and FIG. 3. In an embodiment, the cover 50 is of rectangular shape. The cover 50 can penetrate the opening 33 of the second shell 30 and hold the first magnetic element 41 and the second magnetic element 42 in the fixture tank 34 of the second shell 30.

Before further illustrating the structure of the present invention, the following statement will illustrate the design of every element first. Please refer to FIG. 3 and FIG. 4.

In assemble operation, a first shell 10 is needed to be prepared. Then, a first magnetism element 22 is needed to be prepared. In an embodiment, the steps of preparing the first magnetism element 22, comprising: the induction coil 220 is coiled on the first wrapping element 226 which is penetrated and disposed on the first wrapping portion 2220 of the first magnetism element 22; and the induction coil 221 is coiled on the second wrapping element 228 which is penetrated and disposed on the second wrapping portion 2230 of the first magnetism element 22. The present invention is not limited to the statements mentioned above. In real application, the induction coil 220 and 221 can be coiled on the first wrapping portion 2220 and the second wrapping portion 2230 directly. Then, the first magnetism element 22 is disposed on the first shell 10. The sensor module 20 holds the first hollow portion 11 at an assigned height through the plummer 14 of the first shell 10 and fixed at that level. Then, the pad 26 and the second magnetism element 24 are disposed on the first shell 10. The first slide gap 225, the second slide gap 245 and the third slide gap 265 allow the first magnetic element 41 and the second magnetic element 42 to move within but not contact with the sensor module 30 directly.

Then, a second shell 30 is prepared. The magnetic module 40 is configured in the fixture tank 34 of the second shell 30. The cover 50 penetrates the opening 33 of the second shell and holds the first magnetic element 41 and the second magnetic element 42 in the fixture tank 34 disposed on the external surface 201 of the second shell 20, as showed in FIG. 3.

Then, the four second location hole 350 of the front terminal 30a is paralleled with the four first location pillar 13 of the first shell 10, and the second wall portion 3041 of the rear terminal 30b of the second shell 30 is paralleled with the first engaging portion 103 of the first shell 10. The second shell 30 is disposed on the first shell 10. The second shell 30 is connected with the first shell 10 and fixed through the second location hole 350 and the first location pillar 13, and the second shell 30 is buckled with the first shell 10 and fixed through the second wall portion 3041 and the first engaging portion 103 at the same time.

Wherein when the external force is applied to the power generating device 1, the magnetic module 40 is held by the cover 50, and the relative movement is generated between the fixture tank 34 of the second shell 30 and the cover 50. Then, the magnetic module 40 moves in the first slide gap 225 and the second slide gap 245 along the direction of the external force for the induction coil 220 and 221 inducting a change in magnetic flux to generate induced current. Meanwhile, the magnetic attraction force is generated between the sensor module and the magnetic module to provide a restoring force to cover 50 holding the magnetic module 40 to make the cover 50 move through the opposite direction of the external force. By the way, the relative movement is between 1.5 mm and 2 mm; that is to say, the relative movement between the magnetic module and the sensor module is between 1.5 mm and 2 mm.

Figure 13A:
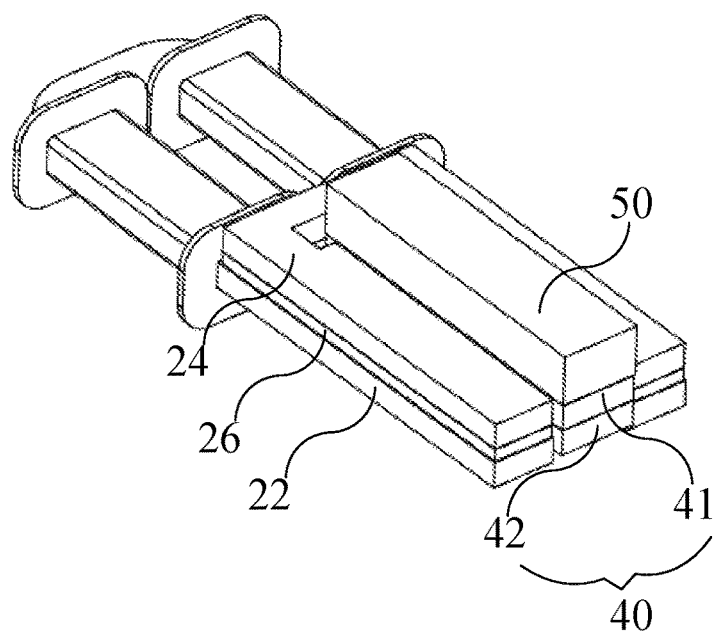
FIG. 13A shows the power generating device comprising the sensor module, the magnetic module and the cover when the external force is not applied to the power generating device in an embodiment of the present invention.
Figure 13B:
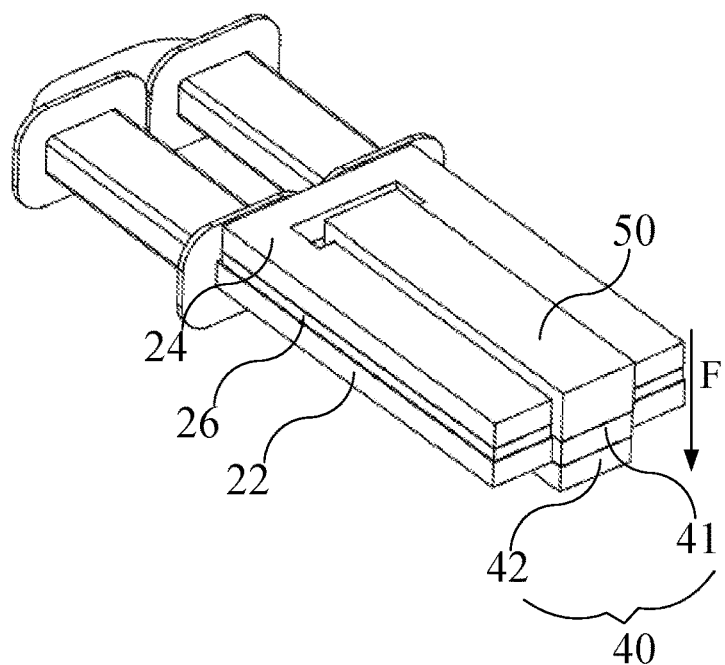
FIG. 13B shows the power generating device comprising the sensor module, the magnetic module and the cover when the external force is applied to the power generating device in an embodiment of the present invention.

Please refer to FIG. 13A and FIG. 13B. FIG. 13A shows the power generating device comprising the sensor module, the magnetic module and the cover when an external force is not applied to the power generating device in an embodiment of the present invention. FIG. 13B shows the power generating device comprising the sensor module, the magnetic module and the cover when an external force is not applied to the power generating device in an embodiment of the present invention.

More particularly, when the external force is applied to the cover 50 of the power generating device 1, the first magnetic element 41 is located between the first slide gap 225, and the second magnetic element 42 is located between the second slide gap 245, as showed in FIG. 13. When the external force F is applied to the power generating device, the first magnetic element 41 of the magnetic module 40 moves toward the second slide gap 245 along the direction of the external force F, and the second magnetic element 42 moves away from the second slide gap 245 along the direction of the external force F, as showed in FIG. 13B. Meanwhile, a first magnetic attraction force is generated between the first magnetism element 22 and the first magnetic element 41, and a second magnetic attraction force is generated between the second magnetism element 24 and the second magnetic element 42. When the external force F applied to the power generating device 1 is vanished, the magnetic attraction force and the second magnetic attraction force provide a restoring force to the cover 50 of the magnetic module 40. The direction of the external force F and the direction of the first magnetic attraction force and the second magnetic attraction force are opposite.

In an embodiment, the power generating device of the present invention further comprises an elastic element disposed in the second location hole 350 of the second shell for raising the restoring force to the cover. In the embodiment, the elastic element is a spring but not limited to the spring, and the elastic element also can be some other elements providing restoring force like air buffer device. More particularly, when the external force F is applied to the power generating device, a first magnetic attraction force is generated between the first magnetism element 22 and the first magnetic element 41; a second magnetic attraction force is generated between the second magnetism element 24 and the second magnetic element 42, and the elastic is compressed by the external force. When the external force F applied to the power generating device 1 is vanished, the first magnetic attraction force and the second magnetic attraction force provides a restoring force to the cover 50 of the magnetic module 40 for rising the restoring force to the cover.

For the output polarity, the design of the present invention can generate an induced voltage with a pulse shape or a triangle wave when an external pressing force is applied to the present invention. The peak value is between 6.5 volts to 15 volts. The width of the pulse is about 16 ms to 42 ms, wherein if the width of the pulse is shorter (which means the external pressing force is larger), the generated peak value of the induced voltage is higher. When returning to its original position, an induced voltage can also be generated, wherein the width of the pulse of the induced voltage is about 88 ms and the peak value of the induced voltage is about 3 volts. Naturally, if the spring return force is larger, the width of the pulse will be shorter and the peak value will be higher.

To summarize the statements mentioned above, the power generating device of the present invention can be used in shoe pads or ground pads. When a user walks or activates the power generating device through an external force, the power generating device will use electromagnetic induction to generate an induced current, to which the induced current can be stored to supply power to the light emitting diodes in order to emit light. It should also be noted that any appropriate electronic device that is integrated in the power generating device of the present invention has the potential to become a green product, as it does not need to connect any types of outside power source or batteries. Therefore, the power generating device of the present invention can be easily installed in shoes to generate power automatically when a user performs an action such as walking. More particularly, the lighting module of the power generating device of the present invention can increase the degree of recognition at night, which also increases the traffic security of the pedestrian.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A power generating device, comprising:
   a first shell having a first hollow portion;
   a second shell coupling with the first shell, the second shell comprising a fixture tank;
   a magnetic module disposed in the fixture tank, and the magnetic module comprising a first magnetic element and a second magnetic element;
   a sensor module disposed in the first hollow portion, the sensor module comprising a first magnetism element, an induction coil coiled on the first magnetism element and a second magnetism element, the second magnetism element disposed on the first magnetism element; and
   a cover holding the magnetic module in the fixture tank, wherein when an external force is applied to the cover, the magnetic module is capable to move along the direction of the external force.

2. The power generating device of claim 1, wherein the first magnetism element comprises a first slide gap, and the second magnetism element comprises a second slide gap; when the external force is applied to the power generating device, the first magnetic element is located within the first slide gap, and the second magnetic element is located within the second slide gap; when the external force is applied to the power generating device, the first magnetic element of the magnetic module moves into the second slide gap along the direction of the external force, and the second magnetic element moves away from the second slide gap along the direction of the external force; when the external force applied to the power generating device is vanished, the first magnetism element and the second magnetism element apply the restoring force to the first magnetic element and the second magnetic element to make the first magnetic element and the second magnetic element move along the opposite direction of the external force.

3. A power generating device of claim 2, wherein the first magnetism element further comprises:
   a first sensor arm, comprising a first extension section and a first wrapping portion for induction coil coiled on the first wrapping portion;

a second sensor arm, comprising a second wrapping portion and a second extension section for induction coil coiled on the second wrapping portion; and
a first connecting portion;
wherein the first slide gap is formed between the first extension section and the second extension section, and the first sensor arm is connected with the second sensor arm through the first connecting portion.

4. The power generating device of claim 3, wherein the first magnetism element is a U-shape.

5. The power generating device of claim 3, wherein the sensor module further comprises a first wrapping element and a second wrapping element, the first wrapping element is wrapped on the first wrapping portion of the first sensor arm for the induction coil coiled; the second wrapping element is wrapped on the second wrapping portion of the second sensor arm for the induction coil coiled.

6. The power generating device of claim 2, wherein the second magnetism element further comprises:
a third sensor arm, comprising the third extension section;
a fourth sensor arm, comprising the fourth extension section; and
a second connecting portion;
wherein the second slide gap is formed between the third extension section and the fourth extension section; the third sensor arm is connected with the fourth sensor arm through the second connecting portion.

7. The power generating device of claim 6, wherein the second magnetism element is a U-shape.

8. The power generating device of claim 2, wherein the sensor module further comprises a pad, the pad is disposed between the first magnetism element and the second magnetism element, the pad comprises a fifth extension section, a sixth extension section and a third connecting portion, a third slide gap is formed between the fifth extension section and the sixth extension section, the fifth extension section is connected with the sixth extension section through the third connecting portion, when the external force is applied to the power generating device, the cover makes the magnetic module move within the first slide gap, and the second slide gap and the third slide gap along the direction of the external force.

9. The power generating device of claim 8, wherein the thickness of the pad is about 1 mm.

10. The power generating device of claim 8, wherein the pad is a U-shape.

11. The power generating device of claim 1, wherein the distance of the relative movement between the magnetic module and the sensor module is between 1.5 mm and 2 mm.

12. The power generating device of claim 11, wherein the magnetic module moves within the sensor module along the direction of the external force with respect to the sensor module for generating an induced voltage, and the induced voltage is higher than 3 volts.

13. The power generating device of claim 12, further comprising an LED, the induced voltage for the LED lighting.

14. The power generating device of claim 11, wherein the induced voltage generated by the magnetic module moving within the sensor module along the direction of the external force to generate the relative movement with respect to sensor module is between 6.5 volts and 15 volts.

15. An object for using a power generating device, wherein:
the object has an accommodating space for holding the power generating device;
the power generating device comprises:
a first shell having a first hollow portion;
a second shell coupling with the first shell, the second shell comprising a fixture tank;
a magnetic module disposed in the fixture tank, the magnetic module comprising a first magnetic element and a second magnetic element;
a sensor module disposed in the first hollow portion, the sensor module comprises a first magnetism element, an induction coil coiled on the first magnetism element and a second magnetism element, and the second magnetism element disposed on the first magnetism element; and
a cover holding the magnetic module in the fixture tank, wherein when an external force is applied to the cover, the magnetic module is capable to move along the direction of the external force.

16. The object of claim 15, wherein the object is a shoe, and the accommodating space is located at a sole of the shoe.

* * * * *